March 31, 1959  R. A. CRESSWELL  2,880,375
ELECTRIC ARC WELDING
Filed May 28, 1956
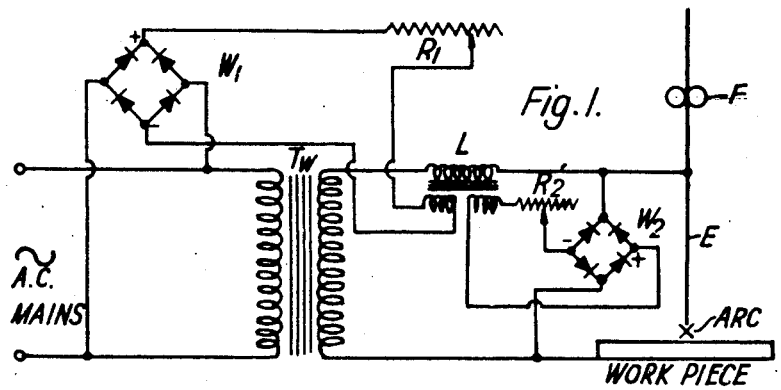
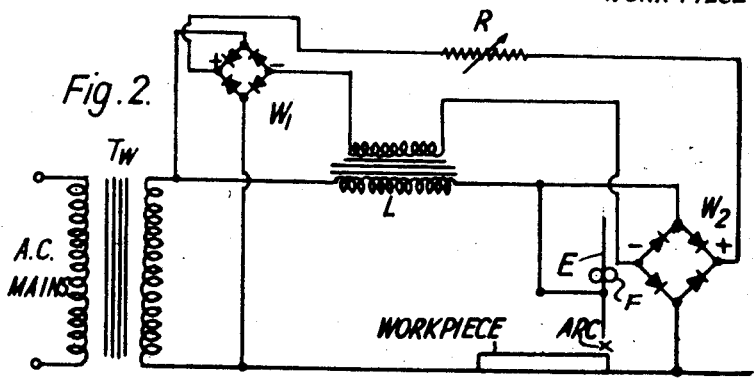
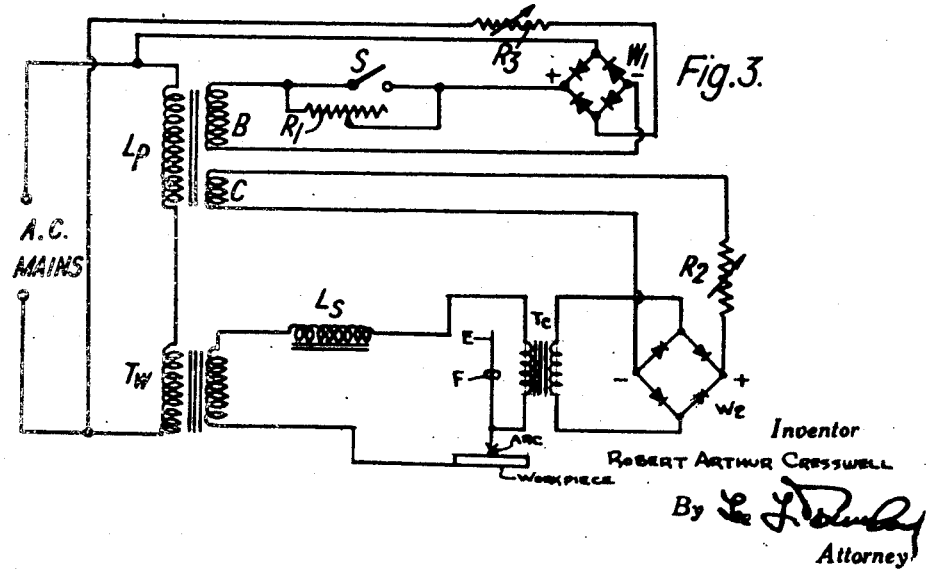
Inventor
ROBERT ARTHUR CRESSWELL
By
Attorney United States Patent Office 2,880,375
Patented Mar. 31, 1959

2,880,375

ELECTRIC ARC WELDING

Robert Arthur Cresswell, Tadworth, England, assignor to The British Oxygen Company Limited, a British company Application May 28, 1956, Serial No. 587,894

Claims priority, application Great Britain May 31, 1955

3 Claims. (Cl. 315—284)

This invention relates to electric arc welding and more particularly to electric arc welding in which a consumable electrode is continuously fed to the arc. The electrode may be a coated electrode or it may be a bare wire electrode used in conjunction with a shield of inert or protective gas or gases or of powdered flux. In such processes it is advisable to use a power supply which is best suited to the particular requirement of the process to give adequate self-adjustment of the arc.

In such processes where the electrode is fed at a constant speed there is some degree of self-adjustment inherent in the electric arc itself, since a lengthening of the arc increases the resistance and tends to reduce the current flowing and thus lower the burn-off rate and bring back the arc length to its original value. However, the stable operating point of an arc must lie along the volt/ampere output curve of the power supply and it can be shown that the power supply output characteristic has a marked effect upon arc self-adjustment. With a conventional drooping characteristic (constant current) source, changes in arc voltage (length) will produce relatively little change in current and thus the degree of self-adjustment is very small. However, as the slope of the power supply characteristic approaches to that of a constant voltage source, the change of current with a small change in voltage becomes progressively greater and thus the degree of self-adjustment is enhanced.

With a constant potential source, therefore, the degree of self-adjustment is very high and easily maintains a constant arc voltage. However, for the same arc voltage, a low current arc is long and a high current arc short. Therefore, to maintain constant arc length, an output characteristic is required corresponding to a constant arc length at whatever current is used. This means that the power supply volt/ampere curve must follow the arc characteristic curve, i.e. a rising voltage with increasing current.

Hitherto direct current supplies have been universally used for these processes. In certain instances it may be desirable to employ alternating current, but with alternating current and its associated arc extinction at every half cycle, it is difficult or impossible to maintain an arc with the relatively flat or slightly rising volt/ampere characteristic, which is so desirable to give good self-adjustment. This is because with the necessarily low open-circuit voltage, the voltage required for arc re-ignition is not available from the power supply. Therefore a high open-circuit voltage supply must be employed with its necessarily drooping volt/ampere characteristic, or, alternatively some external source of arc re-ignition such as the injection of voltage surges or high-frequency pulses must be employed.

It is an object of the present invention to provide a method by which the optimum degree of arc self-adjustment may be obtained irrespective of the power source.

According to one aspect of the present invention, a method of maintaining arc self-adjustment at its optimum in electric arc welding using a continuous electrode comprises controlling the output of an A.C. power supply feeding the arc in accordance with the arc length by means of a saturable reactor, the magnetic saturation of which is controlled by a voltage derived from and varying with the arc voltage.

According to another aspect of the invention, means for controlling an A.C. welding power supply feeding the arc in electric arc welding using a continuous electrode comprises a saturable reactor included in the input or output circuit of the power supply and having a winding energised at least in part by a voltage derived from the arc.

The voltage derived from the arc is preferably balanced against a reference voltage. The resultant voltage determines the degree of saturation of the core of the reactor and therefore determines its impedance to the welding current. Such a system has the advantage of rapid response and needs little maintenance.

The invention will now be more particularly described with reference to the accompanying drawings in which Figures 1, 2 and 3 are circuit diagrams illustrating three methods of applying the invention to the control of the output of an A.C. welding transformer.

Referring to Figure 1, the primary of the transformer TW is connected to an A.C. mains supply and the secondary to the welding circuit, including the electrode E fed by feed rolls diagrammatically represented at F and workpiece. Included in the welding circuit is a saturable reactor L provided with two D.C. control windings. One of these windings is connected in circuit and supplied with a constant pre-set bias voltage from the mains via a bridge rectifier $W_1$ and resistance $R_1$. The second D.C. winding is supplied with a voltage derived from the arc via a bridge rectifier $W_2$ and a resistance $R_2$. The polarity is arranged so that this D.C. winding acts in opposition to the first D.C. winding.

Figure 2 illustrates an alternative arrangement in which only one D.C. winding is used for the reactor L. In this case the D.C. winding is supplied with a voltage from the secondary of the transformer TW via a bridge rectifier $W_1$ and resistance R and also with a voltage from the arc via a second bridge rectifier $W_2$ and the resistance R which is arranged to be in opposition to that supplied via $W_1$. Thus, when operating, the control winding has applied to it a voltage which is the difference between the one supplied from the arc and the one supplied from the transformer secondary.

In operation, in either of these circuits, as soon as the arc is formed, a voltage is supplied from the arc via rectifier $W_2$ and resistance $R_2$ (Fig. 1) or rectifier $W_2$ and resistance R (Fig. 2) which counteracts the applied pre-set bias voltage and this increases the impedance of reactor L. Once satisfactory working conditions are established, which can be selected by choosing the appropriate bias voltage, then should the arc lengthen, the voltage supplied by the arc will increase and the bias voltage will be further decreased which leads to an increase in the impedance L, and thus to a decrease in voltage, and a resultant shortening of the arc back to its original length. On the other hand, should the arc shorten, the voltage from the arc will decrease and thus the effective bias voltage will increase. The effect will then be to increase the voltage and restore the arc to its original length.

In some cases the requisite control may not be achieved by the use of the direct arc voltage. In such cases, an amplifier may be utilised to amplify the arc voltage before it is applied to the control winding of the reactor L. This may be an electronic A.C. amplifier inserted between the arc and rectifier $W_2$ or an electronic or magnetic D.C. amplifier inserted between rectifier $W_2$ and the control winding of the reactor L.

Referring now to Figure 3, this illustrates a system in which control is applied to the primary side of a welding transformer. In this case, the reactor Lp is inserted in series with the primary of the transformer Tw. The reactor Lp is controlled by a bias winding B and a control winding C. This bias winding B is supplied from the mains supply via a resistance $R_3$, a bridge rectifier $W_1$ and the contacts of a voltage sensitive relay S, across which is connected a resistance $R_1$. The control winding C is supplied from the arc via a coupling transformer Tc, a bridge rectifier $W_2$ and a resistance $R_2$, and, in this case, energises the core of the reactor winding, Lp, in the same sense as bias winding B.

In operation, for arc striking, it is arranged that the contacts of relay S are closed and a high bias voltage is accordingly applied to winding B. Therefore the impedance of Lp will be low. As soon as the arc is formed, relay S operates and its contacts open, bringing resistance $R_1$ into circuit and reducing considerably the current through winding B. Thus the impedance of Lp rises and is controlled largely by winding C which is supplied from the arc.

If the arc current increases the bias on reactor Lp via winding C will be increased and the impedance therefore reduced and the voltage and current output will be increased, thus giving an effectively rising volt-ampere characteristic. The slope of the output curve can be varied by changing the settings of resistances $R_1$ and $R_2$.

In the case of a continuously fed electrode at high current density, it is believed that the arc (volt-ampere) characteristic rises. Thus, for a constant arc length, a higher voltage is required at higher currents. If the resultant output curve of the power supply is arranged to have a slope slightly less than that of the actual arc, any small increase in arc length will result in a large drop in current. Thus, the arc will rapidly shorten to its original length. Conversely, any small shortening in the arc will result in a large increase in current which will be reinforced by the biassing effect of winding C, and the arc will rapidly be restored to its original length. The actual operating arc length taken up will depend on the setting of resistance $R_1$ and the electrode feed speed.

In general, feedback from the arc to a suitable control winding on the reactor can be by direct arc voltage, by amplified arc voltage or by current via a transformer.

In order to further stabilise the arc, electron-emissive coatings, such as barium salts, thoria or zirconia may be applied to the electrode or to the workpiece.

By the means described above alternating current may be successfully used with gas shielded consumable-electrode processes. It is particularly advantageous to be able to employ alternating current when welding magnetic materials, such as carbon steels and low alloy steels. In these cases it is advantageous to utilise alternating current as it provides a compromise between the low penetration and heavy reinforcement obtained with direct current electrode positive supply and the deep penetration and smaller reinforcement obtained when using direct current electrode negative supply.

The control means of the present invention may be used with a low open-circuit alternating current or direct current voltage supply. The aim of the control system of the present invention is to correct for any variations between the power supply volt/ampere output curve and the actual arc volt/ampere relationship. In this way the optimum degree of arc adjustment is attained and no automatic control of electrode feed is required. In the case of direct current supplies, the saturable reactor control can be employed on the secondary side of an alternating current transformer, the current being subsequently rectified by conventional means.

I claim:

1. Means for controlling an A.C. power supply feeding the arc in electric arc welding using a continuously fed consumable electrode comprising a saturable reactor having a main winding through which current flows to the arc, a first control winding and a second control winding; means for supplying to the first control winding a substantially constant rectified voltage derived from the A.C. power source; and means for supplying to the second control winding a rectified voltage derived from the varying with the arc voltage; said first and second control windings on the saturable reactor being so arranged that a decrease in rectified voltage derived from the arc results in an increase in the magnetic saturation resulting from the two windings and thus a decrease in the impedance of the saturable reactor.

2. Means for controlling an A.C. power supply feeding the arc in electric arc welding using a continuously fed consumable electrode comprising a saturable reactor having a main winding through which current flows to the arc, and a control winding, means for supplying to this control winding a voltage which is the resultant of a rectified reference voltage derived from the input or output of the A.C. power source and a rectified voltage derived from and varying with the arc voltage, whereby decrease or increase of arc voltage below a predetermined value causes the energisation of the control winding to be such that the impedance of the saturable reactor is decreased or increased respectively.

3. Means for controlling an A.C. power supply feeding the arc in electric arc welding using a continuously fed consumable electrode comprising a saturable reactor having a main winding through which power is supplied to the arc, a first control winding, and a second control winding; means for supplying to the first control winding a substantially constant rectified voltage derived from the A.C. power source; and means for supplying to the second control winding a rectified voltage derived from a current transformer in series with the arc; the control windings on the saturable reactor being wound in such a sense that an increase in arc current, and hence an increase in rectified voltage energising the second winding results in a decrease of impedance of the saturable reactor.

References Cited in the file of this patent

UNITED STATES PATENTS

| | | |
|---|---|---|
| 2,365,611 | White | Dec. 19, 1944 |
| 2,432,529 | Locke | Dec. 16, 1947 |